United States Patent [19]
Stowe, III

[11] Patent Number: 4,953,635
[45] Date of Patent: Sep. 4, 1990

[54] METHOD FOR IMPROVING THE STEAM SPLITS IN A MULTIPLE STEAM INJECTION PROCESS

[75] Inventor: George R. Stowe, III, Bakersfield, Calif.

[73] Assignee: Chevron Research Company, San Francisco, Calif.

[21] Appl. No.: 386,525

[22] Filed: Jul. 27, 1989

[51] Int. Cl.[5] ........................ E21B 36/00; E21B 43/24

[52] U.S. Cl. ........................ 166/303; 166/57; 166/75.1; 137/561 A

[58] Field of Search .................... 166/52, 57, 75.1, 91, 166/272, 302, 303; 122/401; 137/561 A

[56] References Cited

U.S. PATENT DOCUMENTS

| | | | |
|---|---|---|---|
| 3,386,508 | 6/1968 | Bielstein et al. | 166/303 X |
| 4,396,063 | 8/1983 | Godbey | 166/303 X |
| 4,488,598 | 12/1984 | Duerksen | 166/272 X |
| 4,505,297 | 3/1985 | Leech, III et al. | 137/561 A |
| 4,556,107 | 12/1985 | Duerksen et al. | 166/272 |
| 4,607,700 | 8/1986 | Duerksen et al. | 166/303 |
| 4,662,391 | 5/1987 | Tolley | 166/303 X |
| 4,800,921 | 1/1989 | Greebe | 166/303 X |

*Primary Examiner*—George A. Suchfield
*Attorney, Agent, or Firm*—Edward J. Keeling; Ernest A. Schaal

[57] ABSTRACT

A method is disclosed for enhancing the uniformity of steam distribution in a multiple steam injection system having a steam generator, a steam header, a primary steam line connecting the generator to the header, and a plurality of secondary steam lines connecting the header to a plurality of steam injection wells. The method comprises injecting a surfactant into the primary steam line, and mixing the surfactant and steam sufficiently so that the surfactant and the steam enter the header as a foam. The concentration of the surfactant in the foam is in the range of from 0.1 to 1.0 vol %. Preferably, the surfactant is injected into the primary steam line within seventy-five feet of the steam header. More preferably, the surfactant is injected into the primary steam line within fifty feet of the steam header. Still more preferably, the surfactant is injected into the primary steam line within twenty-five feet of the steam header. In one embodiment, at least one of the secondary steam lines is split and additional surfactant is added and mixed prior to said split.

6 Claims, 2 Drawing Sheets

METHOD FOR IMPROVING THE STEAM SPLITS IN A MULTIPLE STEAM INJECTION PROCESS

The present invention relates generally to thermally enhanced oil recovery. More specifically, this invention provides a method and apparatus for improving the uniformity of steam distribution during multiple well injection from a common header.

BACKGROUND OF THE INVENTION

In the production of crude oil, it is frequently found that the crude oil is sufficiently viscous to require the injection of steam into the petroleum reservoir. Ideally, the petroleum reservoir would be completely homogeneous and the steam would enter all portions of the reservoir evenly. However, it is often found that this does not occur. Instead, steam selectively enters a small portion of the reservoir while effectively bypassing other portions of the reservoir. Eventually, "steam breakthrough" occurs and most of the steam flows directly from an injection well to a production well, bypassing a large part of the petroleum reservoir.

It is possible to overcome this problem with various remedial measures, e.g., by plugging off certain portions of the injection well. For example, see U.S. Pat. Nos. 4,470,462 and 4,501,329, which are hereby incorporated by reference for all purposes. However, to institute these remedial measures, it is necessary to determine which portions of the reservoir are selectively receiving the injected steam. This is often a difficult problem.

Various methods have been proposed for determining how injected steam is being distributed in the wellbore. Bookout ("Injection Profiles During Steam Injection," SPE Paper No. 801-43C, May 3, 1967) summarizes some of the known methods for determining steam injection profiles and is incorporated herein by reference for all purposes.

The first and most widely used of these methods is known as a "spinner survey." A tool containing a freely rotating impeller is placed in the wellbore. As steam passes the impeller, it rotates at a rate which depends on the velocity of the steam. The rotation of the impeller is translated into an electrical signal which is transmitted up the logging cable to the surface where it is recorded on a strip chart or other recording device.

As is well known to those skilled in the art, these spinners are greatly affected by the quality of the steam injected into the well, leading to unreliable results or results which cannot be interpreted in any way.

SUMMARY OF THE INVENTION

The present invention is a method for enhancing the uniformity of steam distribution in a multiple steam injection system comprising a steam generator, a steam header, a primary steam line connecting the generator to the header, and a plurality of secondary steam lines connecting the header to a plurality of steam injection wells.

The present invention is based upon the surprising discovery that one can achieve remarkably high uniformity of steam distribution during multiple well injection from a common header by injecting and mixing a surfactant into the steam immediately before the steam enters the header. For instance, instead of achieving the very poor quality splits to individual wells of 30% to 70% steam quality, one can reduce the spread to a range of 64% to 69%. The present invention comprises injecting a surfactant into the primary steam line, and mixing the surfactant and steam sufficiently so that the surfactant and the steam enter the header as an foam. The concentration of the surfactant in the foam should be in the range of from 0.1 to 1.0 vol.%. The point where the surfactant is injected into the primary steam line should be within seventy-five feet of the steam header, preferably within fifty feet, more preferably within twenty-five.

In one embodiment, additional surfactant is injected immediately before any split of the steam lines.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

DETAILED DESCRIPTION OF THE PREFERRED EMBODIMENTS

In its broadest aspect, the present invention is a method of achieving remarkably high uniformity of steam distribution during multiple well injection from a common header by injecting and mixing a surfactant into the steam immediately before the steam enters the header.

The present invention is used in a multiple steam injection system comprising a steam generator, a steam header, a primary steam line connecting the generator to the header, and a plurality of secondary steam lines connecting the header to a plurality of steam injection wells. By "steam generator," we mean an apparatus in which steam is formed. By "steam header," we mean a manifold for distributing steam to a plurality of steam lines. By "primary steam line," we mean a steam line connecting a steam generator to a steam header By "secondary steam line," we mean a steam connection a steam header to a steam injection well.

The invention method comprises injecting a surfactant into the primary steam line, and mixing the surfactant and steam sufficiently so that the surfactant and the steam enter the header as an foam.

By "surfactant," we mean a surface-active substance that is capable of foaming with steam. Examples of surfactants that would work are Chaser CS1010, Chaser SD1000, and Chaser SD1020, which are trademarked products of Chevron Chemical Company and which have high active concentrations (50% active) and the ability to foam at steam injection conditions.

The preferred concentration of the surfactant in the foam is in the range of from 0.1 to 1.0 vol% for economic reasons since low concentrations would still be sufficient to generate sufficient foam.

For best results the surfactant should be injected into the primary steam line within seventy-five feet of the steam header. As a general rule, the closer the injection point is to the steam header the better because the foam will return to a two phase condition if the injection point is too far from the header. Preferably, the surfactant is injected into the primary steam line within fifty feet of the steam header. More preferably, the surfactant is injected into the primary steam line within twenty-five feet of the steam header.

The present invention is especially useful where the header feeds wells of different elevations For instance, if a secondary steam line is split into a plurality of lines, additional surfactant should be injected into that secondary steam line immediately before the split. That injection of surfactant would cause the plurality of lines to have roughly the same steam quality.

Figure 1:
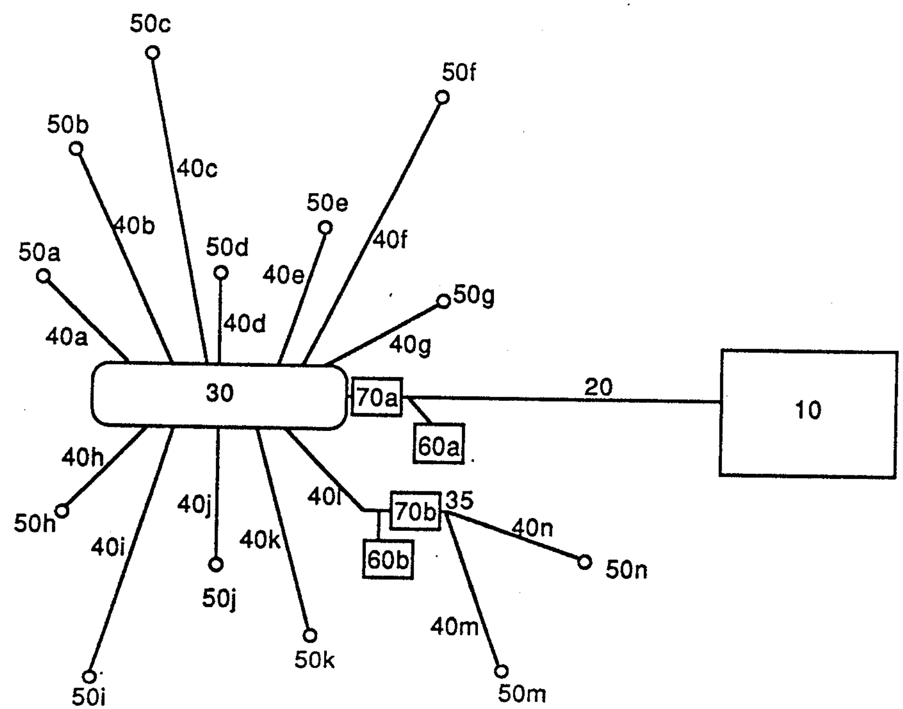
FIG. 1 is a schematic drawing of a multiple well steam injection system of the present invention. That drawing is not drawn to scale.
Figure 2:
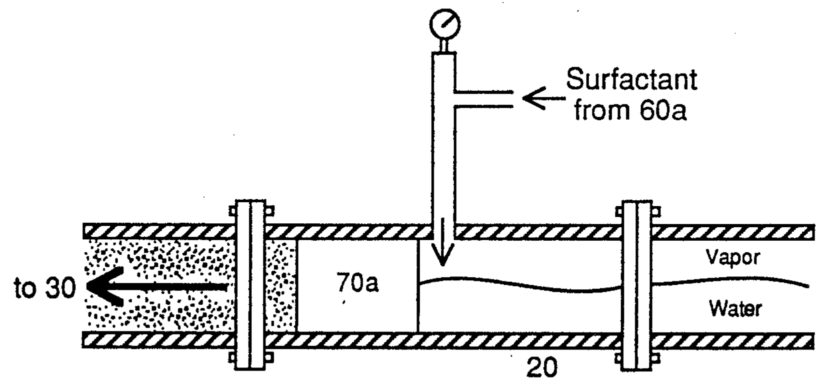
FIG. 2 is a schematic drawing of how surfactant can be injected into the multiple well steam injection system.

Referring to FIGS. 1 and 2, steam is generated in steam generator 10 and is passed through primary steam line 20 to steam header 30 where it is split and sent through secondary steam lines **40*a* through 401 to steam injection wells 50*a* through 50*k* and wells 50*m* and 50*n*. Surfactant, which is stored in vessel 60*a* is injected into the primary steam line 20 and is mixed sufficiently with the steam in static mixer 70*a* to form an foam immediately prior to entering the steam header 30. Because of this foam, the distribution of the steam from the steam header is remarkably uniform through lines 40*a* through 401. Additional surfactant, which is stored in vessel 60*b*, is injected into the secondary steam line 401 and is mixed sufficiently with the steam in static mixer 70*b* to form an foam immediately prior to entering the steam distribution system 35. Because of this second foam, the distribution of the steam from the steam distribution system 35 is remarkably uniform through lines 40*m* through 40*n***.

While the present invention has been described with reference to specific embodiments, this application is intended to cover those various changes and substitutions which may be made by those skilled in the art without departing from the spirit and scope of the appended claims.

What is claimed is:

1. A method for enhancing the uniformity of steam distribution in a multiple steam injection system comprising a steam generator, a steam header, a primary steam line connecting the generator to the header, and a plurality of secondary steam lines connecting the header to a plurality of steam injection wells, the method comprising:
   (a) injecting a surfactant into the primary steam line, and
   (b) mixing the surfactant and steam sufficiently so that the surfactant and the steam enter the header as an foam.

2. A method according to claim 1 wherein the concentration of the surfactant in the foam is in the range of from 0.1 to 1.0 vol%.

3. A method according to claim 1 wherein the surfactant is injected into the primary steam line within seventy-five feet of the steam header.

4. A method according to claim 3 wherein the surfactant is injected into the primary steam line within fifty feet of the steam header.

5. A method according to claim 4 wherein the surfactant is injected into the primary steam line within twenty-five feet of the steam header.

6. A method according to claim 1 wherein at least one of the secondary steam lines is split and additional surfactant is added and mixed prior to said split.

* * * * *